United States Patent [19]

Boucher

[11] 3,842,507

[45] Oct. 22, 1974

[54] RECORDING INSTRUMENT FOR DETERMINING RATE OF PENETRATION IN A BOREHOLE

[75] Inventor: Harry Boucher, Odessa, Tex.

[73] Assignee: Gardner-Denver Company, Quincy, Ill.

[22] Filed: Aug. 8, 1973

[21] Appl. No.: 386,758

[52] U.S. Cl................ 33/134 R, 33/302, 73/151.5, 346/33 WL, 346/65
[51] Int. Cl. ............................................. G01b 3/12
[58] Field of Search ............... 33/134 RA, 129, 302; 346/33 WL, 65; 73/151.5

[56] References Cited
UNITED STATES PATENTS
2,987,823  6/1961  Boucher........................... 33/134 R
3,010,777  11/1961  Melton et al. ................. 346/33 WL Primary Examiner—William D. Martin, Jr.
Attorney, Agent, or Firm—Marcus L. Bates

[57] ABSTRACT

A measuring instrument for monitoring the rate of penetration of a borehole comprising a shaft having a drum thereon which is turned in proportion to movement of the drill string. The shaft has an impulse means thereon and a cam means rotatably journaled to the shaft for limited movement relative thereto, with the impulse means being connected to impart rapid motion into the cam means each time the shaft rotates through an angle which is proportional to the number of lobes located on the cam means. A special cam follower cooperates with the lobes on the cam means so as to provide indicia on a graph representative of drill string rate of travel.

In one mode of operation the cam follower is engaged by the cam lobe only a portion of each cycle, while in the second mode of operation the follower engages the entire face of the lobe. The impulse means is de-energized whenever the recording means is in the second mode of operation.

15 Claims, 11 Drawing Figures

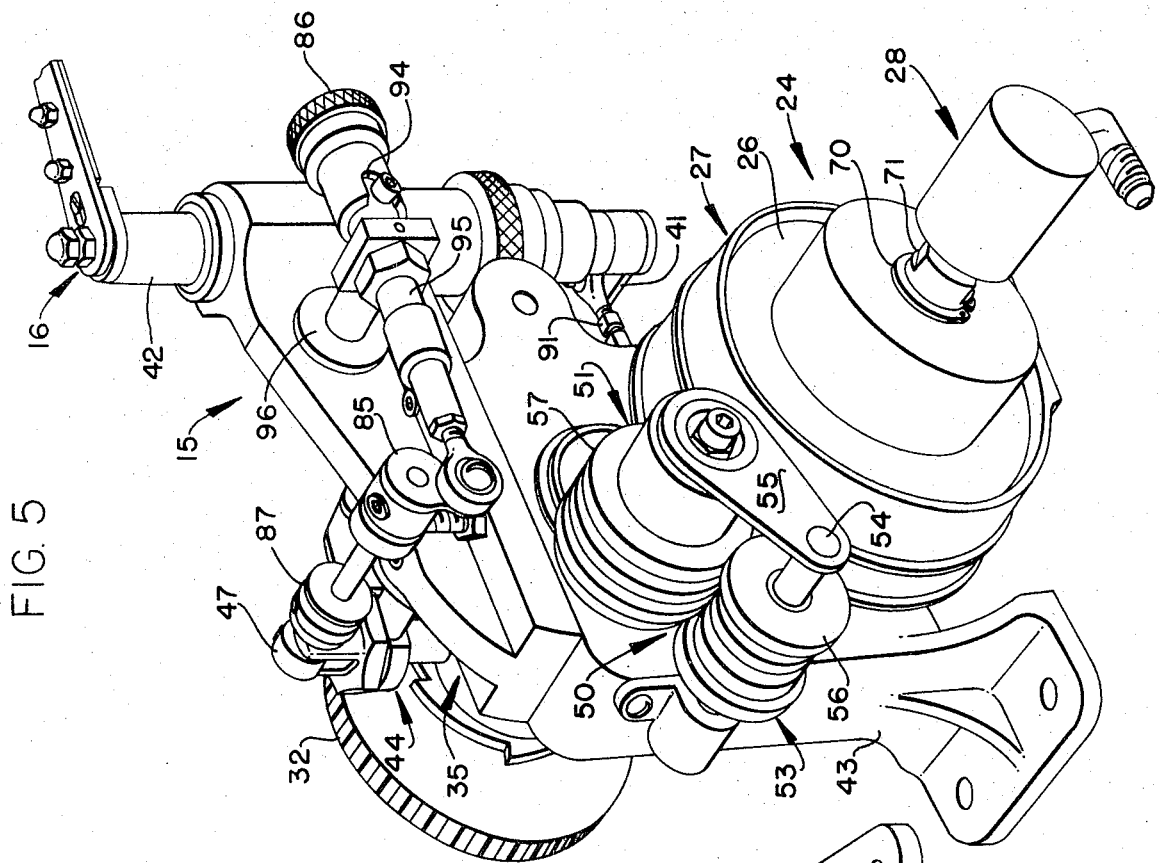
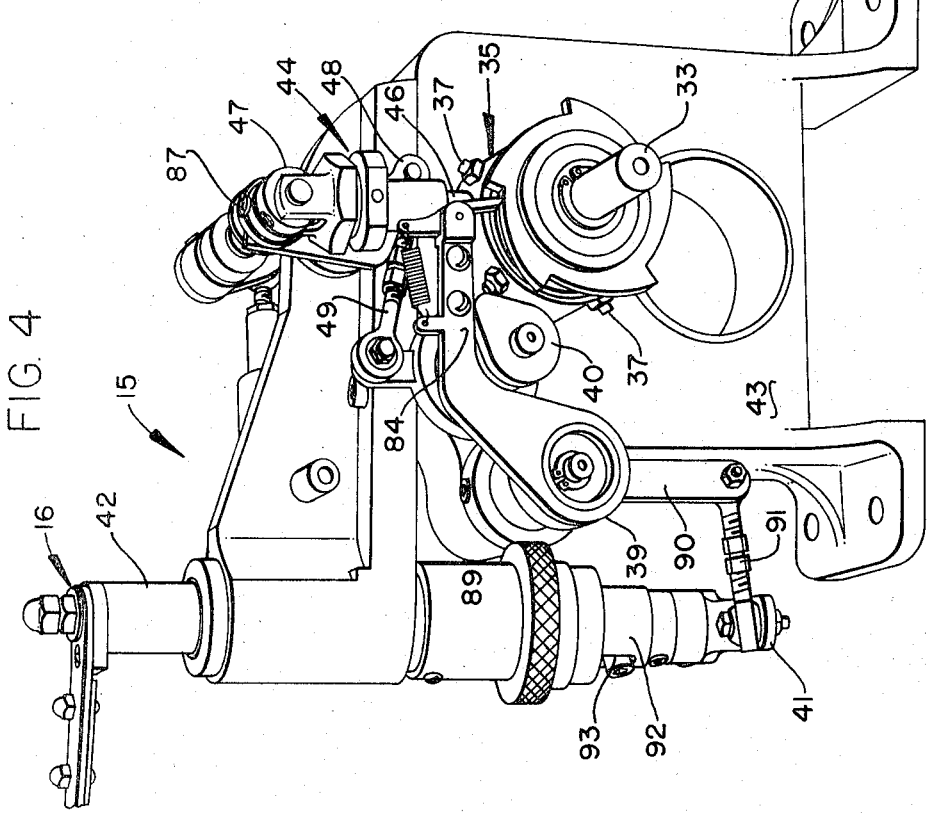

PATENTED OCT 22 1974 3,842,507

RECORDING INSTRUMENT FOR DETERMINING RATE OF PENETRATION IN A BOREHOLE

BACKGROUND OF THE INVENTION

In drilling boreholes, wherein a traveling block lowers a string of drill pipe into the earth as the drilling ring makes hole, it is common to attach one end of a wire line to the traveling block, and to rove the line about a series of pulleys, and to attach the remaining end of the line to an automatic rewind device so that the wireline is moved one foot for each foot of penetration made by the drilling rig. In my prior U.S. Pat. No. 2,987,823, there is set forth a measuring device for monitoring the rate of penetration of a drill bit by roving a wireline about a drum in the above described manner so that movement of the line causes the action of the drill bit to be recorded on a chart.

In my before mentioned measuring device, it has been found that the overall height of the mechanical apparatus is excessive for many purposes and for this reason it is desirable to reduce the height thereof. Moreover, in making hole, the bit sometimes moves at an extremely slow rate of penetration so that a connection is made each 36 hours or so; and for this reason, it is desirable to have made available a measuring device which graphically reflects this slow rate of penetration in a suitable manner. At other times, connections must be made or added to the drill string at intervals of less than one hour, and accordingly, the pen rapidly forms indicia on a chart in a form which is difficult to read because the cycles are too closely spaced.

Accordingly, it is desirable to have two different modes of operation in a measuring device for measuring rate of penetration of a drill bit so that one mode of recording can be employed when drilling at a slow rate which will enable subsequent analysis of the chart to immediately reveal all aspects of the rate of penetration; and, in the second mode of operation, where the drilling is rapid, the chart apparatus can be made to accurately reveal the rate of penetration in a more logical and meaningful manner.

It is further desirable that the above measuring device be provided with a cam means which, in the first mode of operation, moves a pen across the chart to form a curve having a slope which is proportional to the rate of penetration; and, in the second mode, to provide the pen with a kick by the provision of an impulse apparatus.

SUMMARY OF THE INVENTION

The present invention comprehends a measuring apparatus comprising a shaft having an impulse means thereon which can be disengaged in one of two modes of operation. A cam means having a cam lobe placed thereon is journaled to the shaft for limited movement relative thereto. The impulse means is connected to impart rapid motion into the cam means each time the shaft rotates through a predetermined angle which is proportional to the number of lobes placed on the cam.

The lobe actuates a cam follower which actuates a recording means. The impulse means is used during a rapid rate of penetration and is de-energized during a slow rate of penetration, so as to provide stored knowledge in the form of indicia upon a recording means which is easily and accruently related to the action of the drill string.

Accordingly, a primary object of the present invention is the provision of a measuring instrument which places stored knowledge in the form of indicia on a recorder means in two different modes of operation depending upon the rate of penetration.

Another object of the invention is to provide improvements in a chart means for measuring the rate of penetration of a drill bit.

A further object of this invention is to disclose and provide improvements in measuring instruments wherein the pen drive means is connected to be moved with an impulse action.

A still further object of this invention is to provide improvements in a measuring instrument wherein linear motion of a wireline is recorded on a chart in a manner which pictorially represents the action of the drill bit in a new and improved manner.

Another and still further object of the present invention is to provide improvements in measuring instruments wherein the rate of travel of a member is measured by rotating a shaft proportional to the rate of travel of the member with the shaft driving a pen by a cam means, and with the cam means being connected to the shaft means by an impulse means.

An additional object of this invention is to provide a footage indicating and recording instrument in combination with borehole forming apparatus.

An additional object of the present invention is to provide a measuring instrument which records the movement of a wireline in the form of a chart and wherein the sensitivity of the graph placed on the chart can be selected in one of two different modes of representation.

These and various other objects and advantages of the invention will become readily apparent to those skilled in the art upon reading the following detailed description and claims and by referring to the accompanying drawings.

The above objects are attained in accordance with the present invention by the provision of apparatus fabricated in a manner substantially as described in the above abstract and summary.

BRIEF DESCRIPTION OF THE DRAWINGS

FIG. 4 is a reduced perspective view as seen from one side of the apparatus disclosed in FIG. 3, with some parts being removed therefrom so as to better disclose the remainder of the invention;

FIG. 5 is a perspective view showing the side of the apparatus disclosed in FIG. 3;

DETAILED DESCRIPTION OF THE PREFERRED EMBODIMENTS

Figure 1:
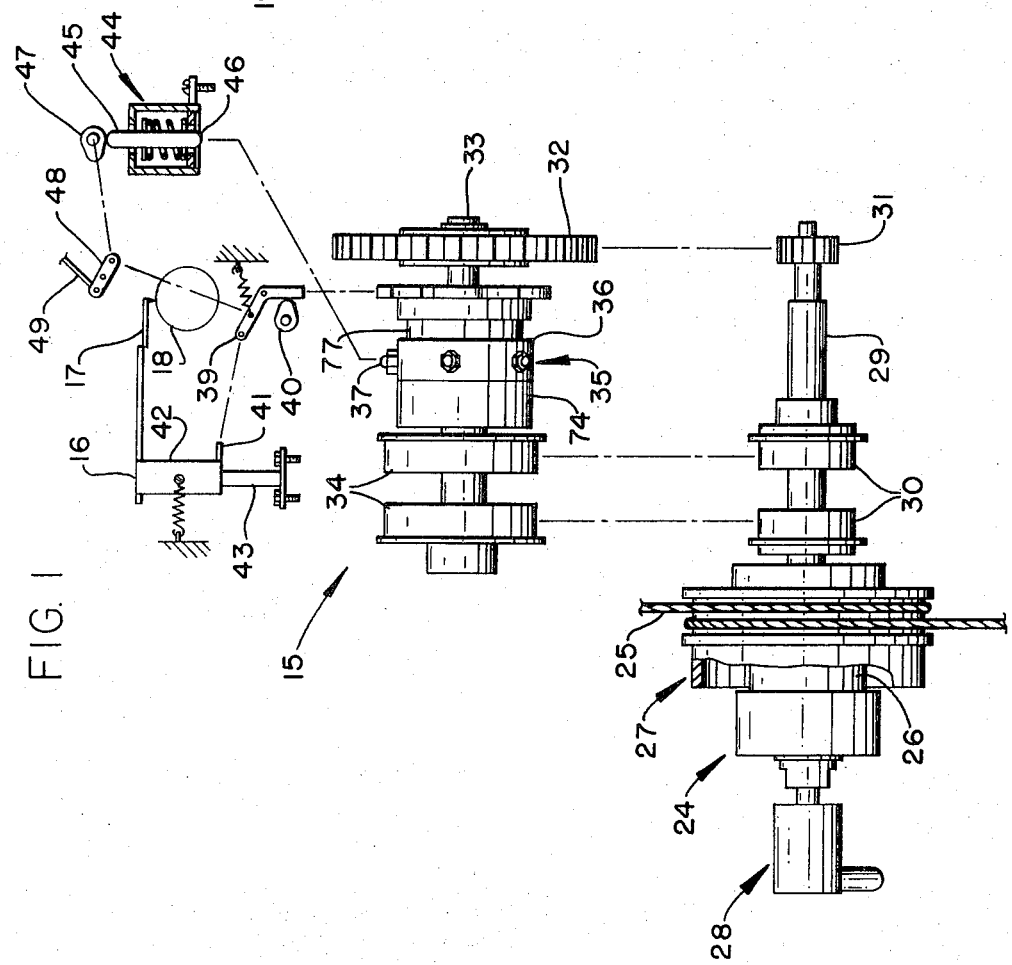
FIG. 1 is a part schematical, part diagrammatical, broken, part cross-sectional representation of apparatus built in accordance with the present invention.

Throughout the various figures of the drawings, the numerals used in the part diagrammatical, part schematical representation set forth in FIG. 1 will relate to the various other numerals used throughout the figures of the drawings, wherever it is practical or logical, so that comprehension of the operation of FIG. 1 will enable those skilled in the art to better appreciate the more detailed illustrations found in other figures of the drawings.

Figure 2:
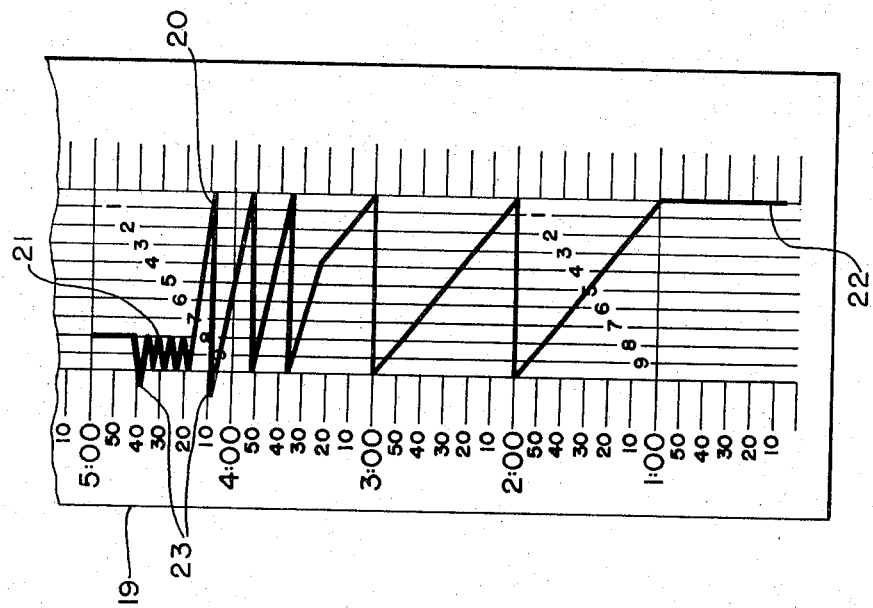
FIG. 2 is a plan view of a chart having a graph drawn thereon by apparatus made in accordance with the present invention.

In FIG. 1 there is schematically illustrated the invention 15, comprised of a pen assembly 16 for pivotally supporting pen 17 so that the pen scribes indicia upon the rotating chart placed on drum 18. As seen in FIG. 2, chart 19 may be placed upon the drum of FIG. 2 in the usual manner with the indicia 20, 21, 22, and 23 being formed by the pen in accordance with the apparatus of the present invention.

Figure 9:
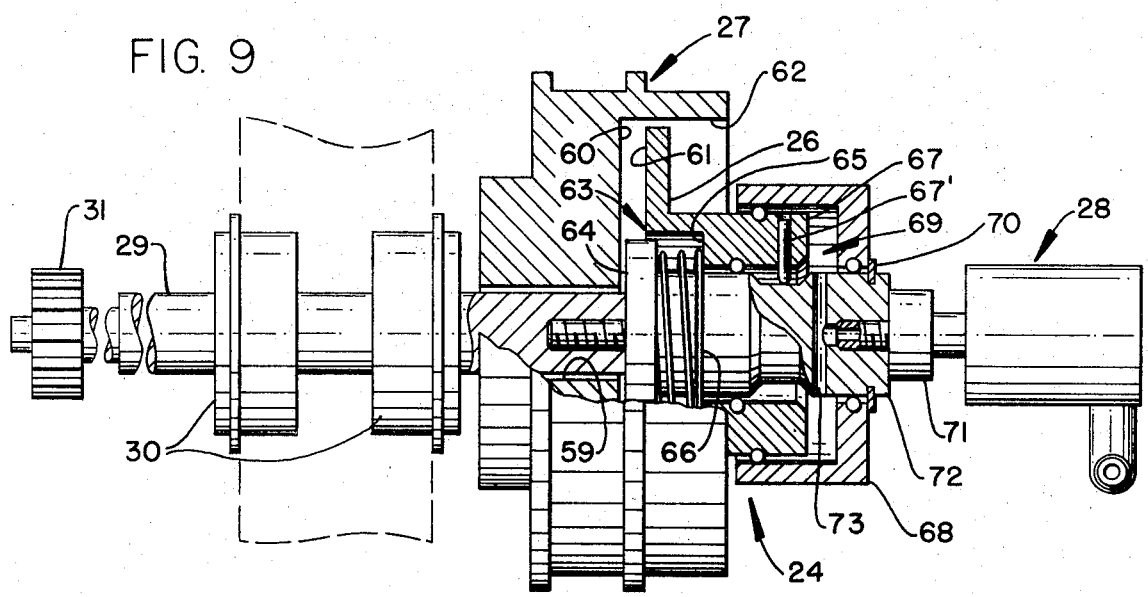
FIG. 9 is an enlarged, part cross-sectional, broken view of a part of the apparatus disclosed in FIGS. 1 and 3–7.

A drum assembly 24, the details of which are more fully disclosed in FIG. 9, receives cable 25 roved thereabout in a particular manner while clutch actuator 26 releasably engages a clutch plate located on relative rotatable drum member 27. A stationary swivel 28 provides an air supply for remotely actuating the clutch assembly in a controlled manner.

Drive shaft 29 is journaled in aligned relationship between spaced support bearing means 30 so that drive gear 31 is rotated one revolution in accordance with one foot of movement of cable 25, when the clutch is engaged.

The drive gear is meshed with a driven gear 32, with the relative sizes preferably being a ratio of 1/5. The driven gear drives a shaft 33 which is journaled within the spaced support bearing means 34. The driven shaft is attached to and drives the impulse assembly 35, which includes impulse housing 36 having the five spaced interrupters 37 located thereon and circumferentially spaced 72° apart. Cam assembly 38 is journaled to the driven shaft while the interrupter assembly is connected to the driven shaft by means of a lost-motion spring loaded coupling, the details of which will be explained later on in this disclosure. It will be noted that one cam lobe is included for each interrupter is indexed relationship therewith.

As seen in FIGS. 1 and 4, the pen drive bellcrank 39 is journaled to the apparatus so that it is pivotally moved by the camed wheel 38. Cam lobe 40 limits the action of the bellcrank 39 when the bellcrank is engaged and moved a limited distance by the cam lobe. The bellcrank is attached to a pen drive crank 41 by a lever arrangement as will be discussed later on in this disclosure.

Support 43 journals the pen barrel assembly for pivotal movement relative to the remainder of the apparatus.

As best seen in FIGS. 1 and 4–7, a plunger housing 44 reciprocating receives a plunger 45 therewithin with the lower depending end of the plunger having a spring loaded contact 46 located therewithin. Cam 47 engages and extends the plunger against the illustrated compression string as the spring loaded contact 46 releasably engages each of the interrupters, causing the pen drive assembly to record the action of the rotating cam assembly only during a portion of each revolution of the drum assembly. Cams 40 and 47 are actuated by the cam actuating member 48 which in turn is actuated by cam actuating lever 49.

Figure 6:
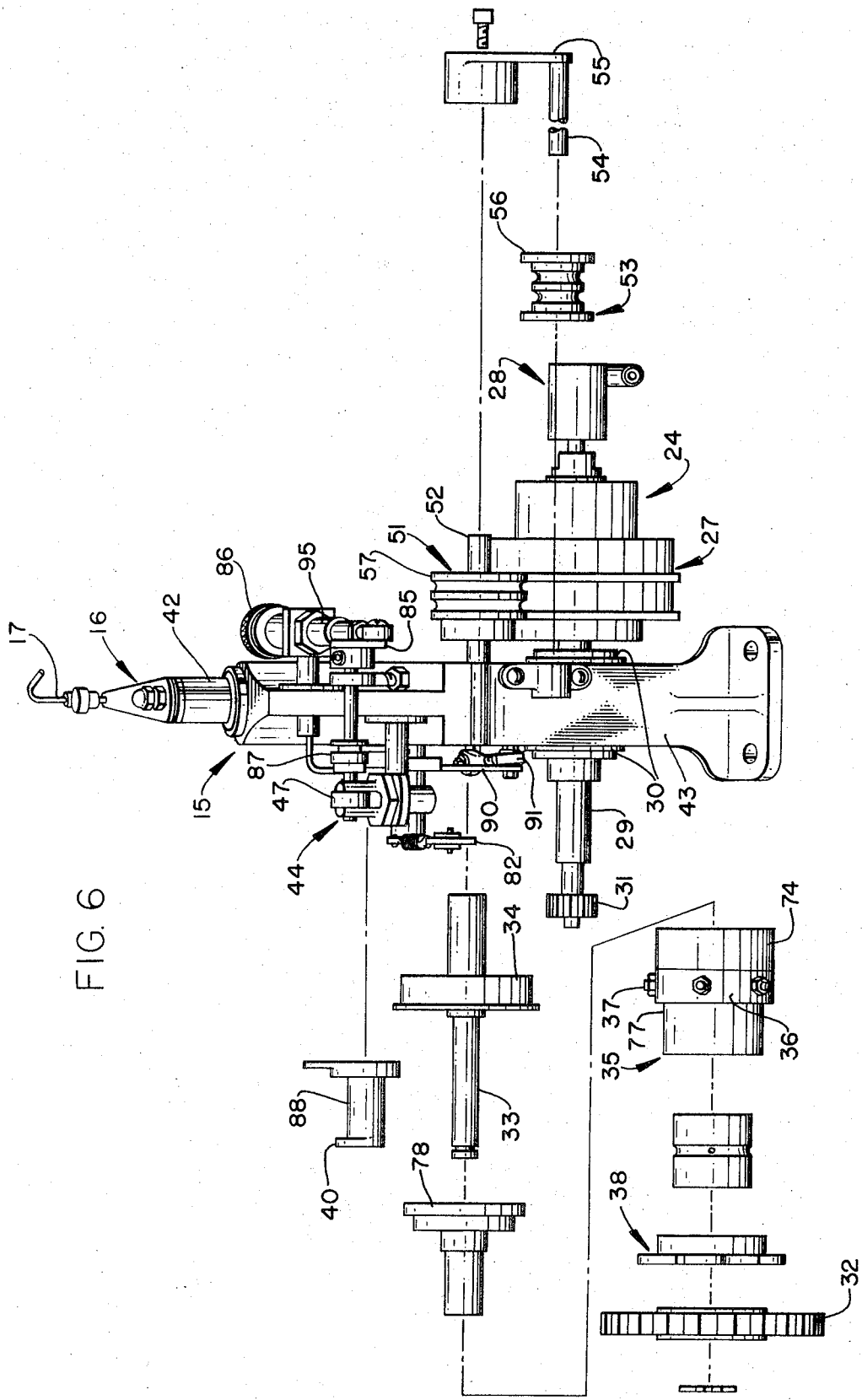
FIG. 6 is an exploded view of the apparatus disclosed in FIGS. 1 and 3–5.
Figure 11:
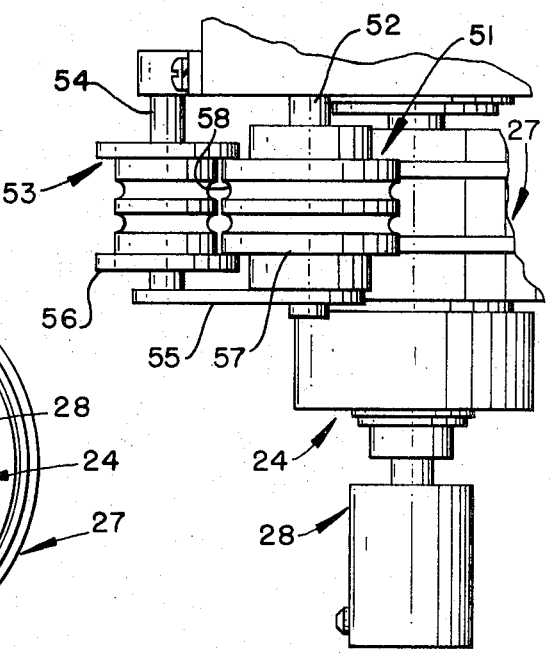

A cable guide means 50, the details of which are disclosed in FIGS. 5, 6, and 11, is comprised of a large spool 51 journaled to shaft 52, and a small spool 53 journaled to shaft 54 with the free ends of the shaft being tied together by sheave alignment plate 55. Each of the spools have opposed overlapping flanges 56, 57 spaced from one another an amount to leave guide holes 58 which are formed by adjacent grooves of the adjacent spools.

As seen in FIG. 9, the free-wheeling drum is provided with an axial bore 59 and a circumferentially extending clutch plate face 60 engagable with clutch plate face 61, with the clutch member being concentrically arranged and reciprocatingly received within the circumferentially extending skirt member 62.

Counterbore 63 of the movable clutch member is slidably moved in a reciprocating manner which enables the enlargement 64 to be received therewithin, with the counterbore terminating in the form of a shoulder 65 so that compression spring 66 is received within an annulus formed therebetween. Clutch plate boss 67 is provided with a radially disposed guide pin 67' affixed thereto and movable therewith, with the pin riding within the illustrated longitudinally disposed groove to thereby form a splined connection between the movable clutch plate member and a shaft extension member 72.

Cylindrical inwardly opening housing 68 forms a clutch actuating cylinder which cooperates with the remainder of the apparatus to form a sealed expansion chamber 69. Snap ring 70 prevents rearward motion of the clutch actuating cylinder. A signal transfer sub 71 is threadedly affixed to the shaft extension member by means of the illustrated hollow fastener so that passageway 73 communicates the expansion chamber with a pneumatic signal by means of the before mentioned swivel 28.

Looking again now to the details of FIGS. 1, 3, 4, 6, 7, and 8, it is seen that the impulse spring housing 74 is provided with a lost motion slot 75 for guidably receiving a tripping bolt 76 therewithin. The tripping bolt is affixed to a cam carrier 77. Coil spring 78 has one end thereof affixed to shaft 33 with the remaining end thereof being affixed to the housing as illustrated by numeral 79 in FIG. 8.

Numeral 80 illustrates one of five equally spaced apart cams, hereinafter called "one lobe of the cam." One of the five cam lobes is spaced radially further from shaft 33 as indicated by numeral 80'. The end of each cam lobe is indicated by numeral 81. The pen drive includes a one way pen ratchet assembly 82 which forms part of the pen drive bellcrank assembly.

Stop means 83 is affixed to lever 84 of the bellcrank so that the finger 82 is biased thereagainst by the illustrated spring, thereby permitting the finger to assume the indicated position 82'. Lever 84 transfers motion from the curved cam lobe face into the pen.

Figure 3:
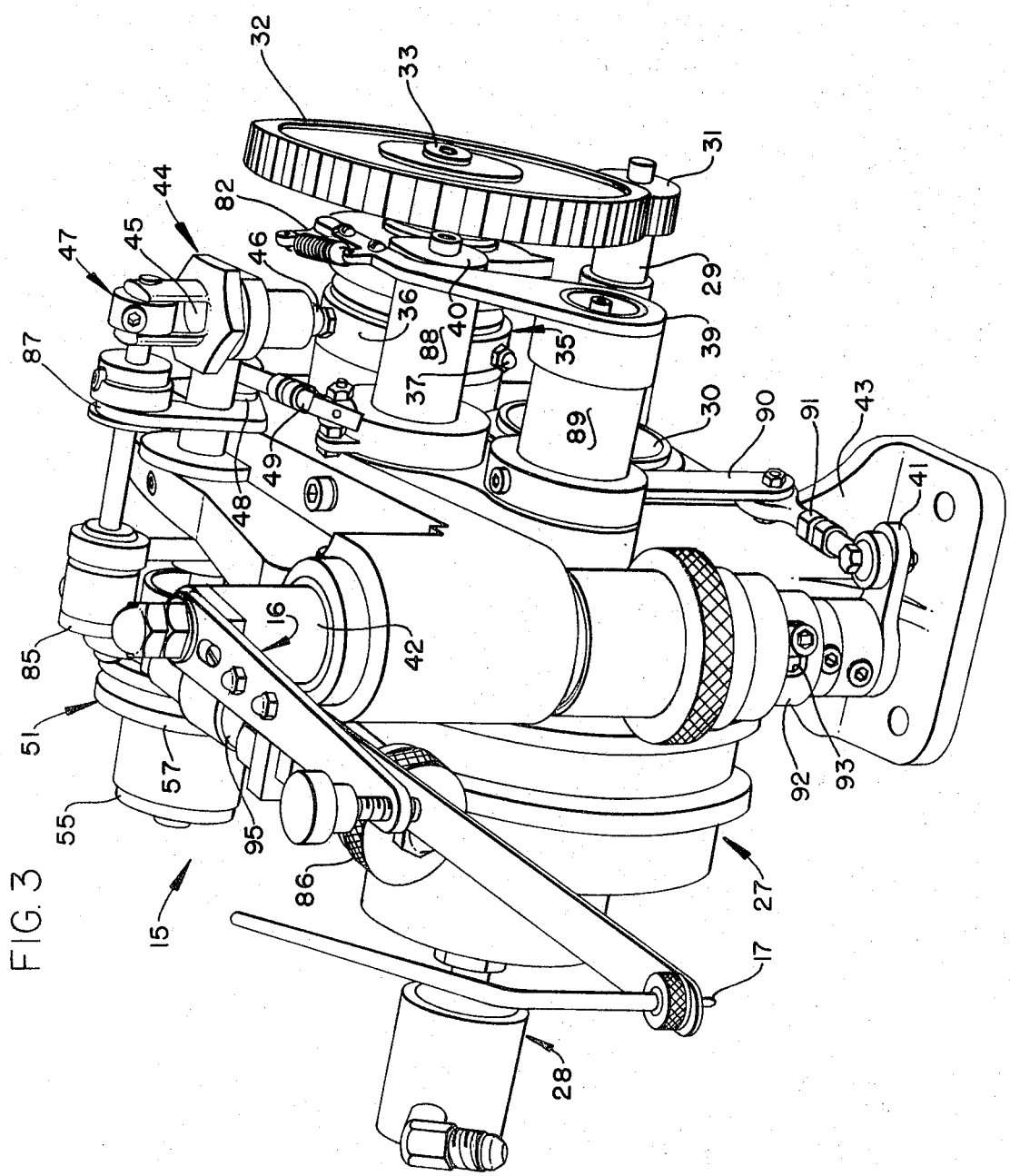
FIG. 3 is an enlarged perspective front view of the measuring instrument seen in FIG. 1 made in accordance with the present invention.
Figure 7:
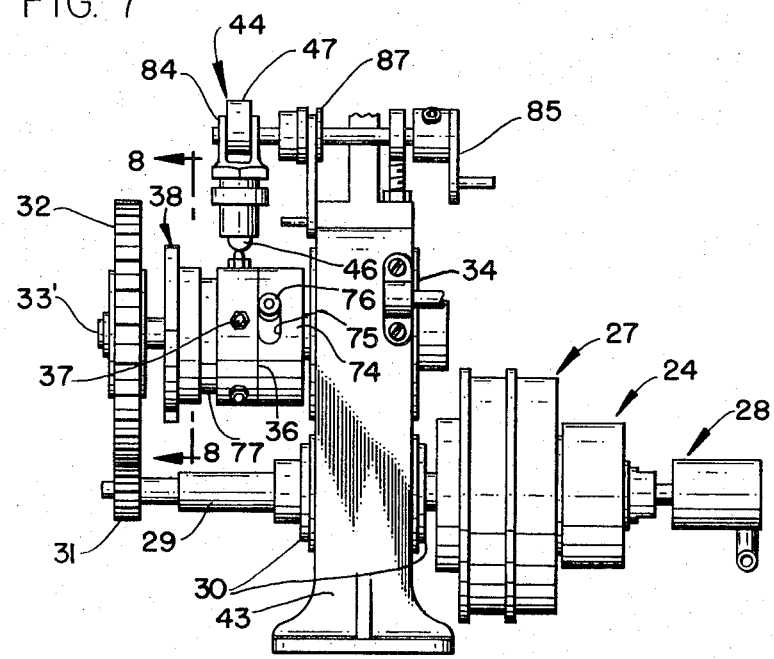
FIG. 7 is a reduced fragmentary rear view of the apparatus disclosed in FIG. 3.

As seen in FIG. 7, in conjunction with some of the remaining figures, crank 85 is actuated by an adjusting knob 86, with the crank moving the illustrated shaft which in turn moves crank 87 along with the before mentioned cam 47. Cam body 88 is an integral part of and supports the before mentioned cam 40 to provide a cam lobe which is connected to the illustrated lever means 49 having the end thereof affixed to the before mentioned crank 85 at 87. As seen in FIG. 3, crank housing 88 is suitably journaled to the main body of the instrument so that movement of lever 84 imparts movement into crank 90 which in turn moves lever 91 to thereby cause the before mentioned lug 41 to move the pen of the instrument.

Spring loaded pen drive shaft 92 has the illustrated lost-motion slot 93 located therein so that the pen is moved with a limited arcuate motion which is of a sufficient magnitude to accommodate the cam action and chart width.

As seen in the illustration of FIG. 5, the adjusting knob 86 is provided with a spring loaded lost-motion slot 94 for the selector so that a reciprocatable drive shaft 95 can move crank 85 into one of two alternate positions. Numeral 96 indicates a shaft housing support by which the selector drive shaft assembly 86, 94, 95 can be journaled to the instrument housing.

In operation, cable 25' is spooled about a rewind drum (not shown) with a marginal length thereof being rove about drum 27, through the cable guide means, and with the remaining end 25 being fastened to the swivel or traveling block of a drilling rig. As the rig makes hole, longitudinal movement of cable 25 causes drum 27 to rotate, with each foot of movement of the drill string causing the drum to rotate exactly one revolution. Air pressure applied at the air swivel moves the clutch apparatus into engagement with the drum thereby causing the driven gear to move exactly one revolution each five revolutions of the drive gear.

Assuming knob 86 is moved forward toward mount post 96 and into the illustrated position of FIG. 5, crank 85 will be rotated clockwise, causing movement of cam 47 in an upward direction, while at the same time lever 49 moves cam 40 of FIG. 4 clockwise so the lever 84 of FIG. 4 moves clockwise. In this position of operation, plunger end 46 rides free of the interrupter elements 37 while the free end of member 82 rides along the entire surface of the cam lobe in the illustrated manner of FIGS. 4 and 8.

Accordingly, each rotation of the drum will cause one cam face to be brought to bear against and to impart motion into bellcrank 39. As seen in FIG. 4, the bellcrank is comprised of levers 84 and 90. Therefore, rotation of the cam wheel causes oscillatory movement of lever 84, which in turn oscillates housing 89, thereby causing crank 90 to move lever 91 which in turn pivots linkage 41, thereby oscilating the pen one cycle of operation at 22, FIG. 2, for each one foot of penetration made by the drill bit.

When it is desired to change the mode of recording, adjusting knob 86 is pulled in an outward direction and turned out of slot 94, thereby moving lever 95 which in turn moves crank 85 in a counterclockwise direction and brings cam 47 to force plunger 45 in a downward direction, while at the same time cam 40 lifts arm 84 into a position which engages the outermost face of each of the rotating cam lobes. This action causes the spring loaded contact 46 of the plunger to releasably engage in a sequential manner each of the interrupters 37, so that the cam wheel 38 is rapidly moved with an impulse action as each of the interrupters move into engagement with the spring loaded contact 45.

The impulse action of the cam wheel results from the plunger contact 46 engaging and holding the captured ball 37 of the impulse element 36. As driven shaft 33 continues to rotate relative to the impulse housing, spring 78 is torsionally loaded until tripping bolt 76 engages the end of the lost-motion slot 75, whereupon the bolt forces the housing to move with the shaft because the force provided by the spring loaded plunger has been exceeded. As the ball rides under the plunger, the spring 78 accelerates the cam wheel until the tripping bolt engages the opposed end of the lost-motion slot. The action is similar to the operation of an impulse magneto found on a farm tractor.

Accordingly, the impulse action provides a curve on the chart as seen illustrated by the numeral 21 in FIG. 2, while the cam in the absence of the impulse action provides a chart illustrated by numeral 20.

Looking again to the details of FIG. 2, it will be noted that the graph 22 is being drawn upon a chart 19 so that the Pusher or the Geologist can readily determine that the rig was not making hole until 1:00 O'clock, and thereafter 1 hour was required to make 1 foot of hole. At 3:22 the drill bit entered a soft formation and the rate of penetration changed from 1 foot per hour to 1 foot each 15 minutes. At 4:18 a still softer formation was encountered by the drill bit and the rate of penetration became still greater and accordingly, had the apparatus been lift in the mode of operation seen at 22, the graph would have been meaningless because the ink would have run together. It will be noted that the Geologist can determine within 0.1 foot the depth at which the softer formation was encountered by the drill bit. Therefore, the apparatus was changed into the second mode of operation at 21 with emphasis now being placed upon the 5 foot intervals 23. It will now be appreciated that the graph at 22 is not using the impulse while the graph at 21 is using the impulse interposed between the cam and the shaft.

Figure 10:
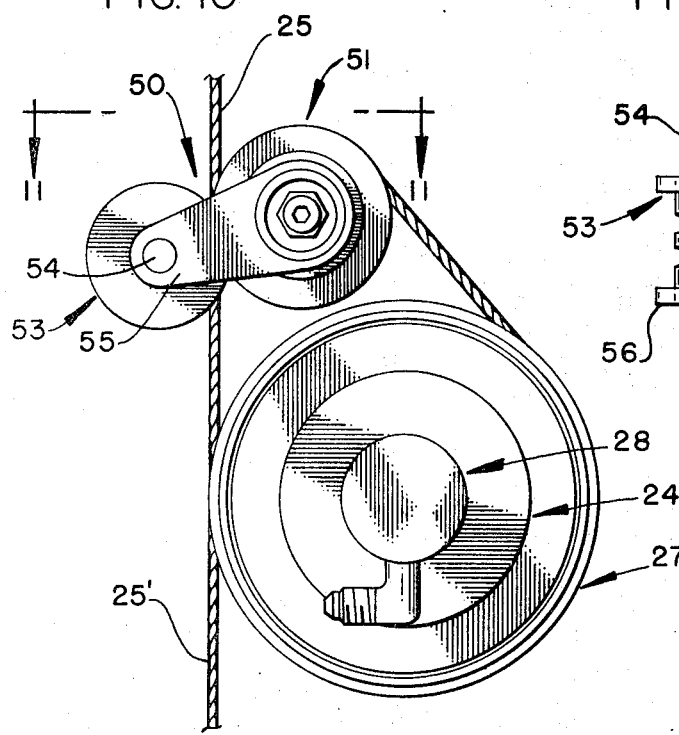
FIG. 10 is an enlarged, side elevational view which discloses part of the apparatus seen in the foregoing figures; and, FIG. 11 is an enlarged, fragmentary, top plan view of part of the apparatus disclosed in FIG. 10.

The cable guide means illustrated in FIGS. 10 and 11 greatly reduces cable wear in proximity of the drum for the reason that spaced marginal contacting portions of the cable are maintained separated from one another by threading the cable into and out of the different tunnels provided at 58 as the cable is roved about the cable receiving drum portion defined by the illustrated spaced flanges.

Figure 8:
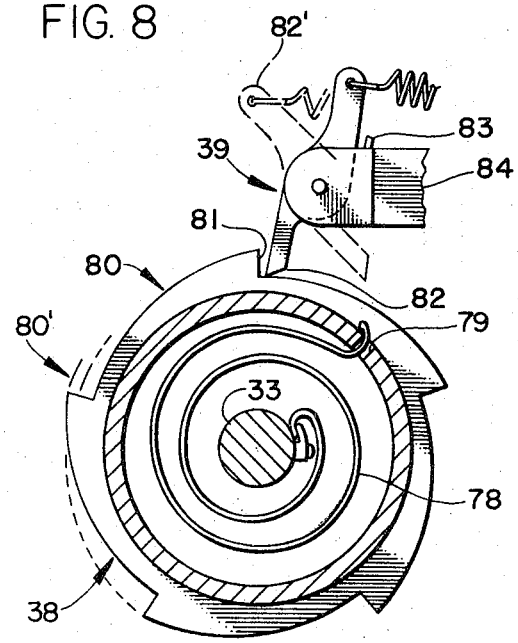
FIG. 8 is an enlarged, part cross-sectional, broken view of part of the apparatus disclosed in FIGS. 1 and 3–7.

The improvement in the cam follower as specifically set forth in detail in FIG. 8 prevents damage to the cam follower should the clutch inadvertently be left engaged while picking up the drill string. Should the cam wheel of FIG. 8 be driven clockwise, finger 82 will move into the dot-dashed position 82' rather than causing breakage of the various linkage to occur.

I claim:

1. A measuring instrument, comprising a shaft having an impulse means thereon, a cam means having a lobe thereon, said cam means being journaled to said shaft for limited movement relative thereto, said impulse means being connected to impart rapid motion into said cam means each time said shaft rotates through an angle proportional to the number of lobes on said cam means, a recording means including a scribe, and means for actuating said recorder means by said lobe;

a drive means on said shaft, said drive means including a drum, a disconnect means for selectively engaging said drum to said drive means;

said drum includes a cable means roved thereabout for rotating said drum in response to linear movement of the cable means;

said means responsive to movement of said cam means includes a cam follower;

said cam follower being connected to move said scribe means in response to movement of said lobe; and, means by which said impulse means can be de-actuated to allow said cam means to move in direction proportion to rotational movement of said shaft means.

2. The measuring instrument of claim 1 wherein means are provided for causing said cam follower to engage said lobe only during part of its rotational movement.

3. The measuring instrument of claim 1 wherein said cam means has a plurality of lobes thereon, one said lobe being larger than the other of said lobes so that said pen is moved a greater distance by the larger lobe as compared to the distance said pen is moved by the remaining lobes.

4. A measuring instrument for recording movement of a member, comprising a shaft means, said shaft means being connected to be turned in proportion to movement of the member so that the angle of rotation of the shaft means is a measure of the movement of the member;

a recorder, a cam means, an impulse means, means by which said cam means is journaled for limited rotational movement to said shaft means so that said cam means can be rotated from a first to a second position relative to said shaft means;

said impulse means holds said cam means so that said shaft rotates to cause said cam means to move from said first to said second position whereupon said impulse means release said cam means and causes said cam means to rotate to said first position;

and means responsive to movement of said cam means for actuating said recorder means.

5. The measuring instrument of claim 4 and further including a drive means of said shaft, said drive means including a drum, a clutch means for engaging said drum to said drive means, and means for remotely actuating said clutch.

6. The measuring instrument of claim 4, and further including a drum, a clutch means, a second shaft, means for remotely actuating said clutch means; said clutch means, when actuated, engages said drum with said second shaft;

means connecting said second shaft to the first recited shaft;

said recorder means being a graph, a scribe positioned to place indicia on said graph, said means responsive to movement of said cam means being connected to actuate said scribe means.

7. The measuring instrument of claim 6, wherein said drum includes a cable means roved thereabout for rotating said drum in response to linear movement of the cable means;

said means responsive to movement of said cam means includes a cam follower;

said cam means having a lobe thereon, said cam follower connected to move said scribe means in response to movement of said lobe.

8. The measuring instrument of claim 7 and further including means by which said impulse means can be de-actuated so that said cam means moves in direct proportion to said shaft means.

9. The measuring instrument of claim 7 wherein means are provided for causing said cam follower to engage said lobe only during part of its rotational movement.

10. The measuring instrument of claim 4 and further including means by which said impulse means can be de-actuated so that said cam means moves in direct proportion to said shaft means.

11. The measuring instrument of claim 4 and further including a drum, a clutch means, a second shaft, means for remotely actuating said clutch means; said clutch means, when actuated, engages said drum with said second shaft; said drum includes a cable means roved thereabout for rotating said drum in response to linear movement of the cable means with said cable means being connected to be moved by the recited member;

means connecting said second shaft to the first recited shaft;

said recorder means including a graph, a scribe positioned to place indicia on said graph, said cam means having a lobe thereon, said means responsive to movement of said cam means including a cam follower connected to actuate said scribe means in response to movement of said lobe.

12. The measuring instrument of claim 4 and further including a drive means on said shaft, said drive means including a drum, a clutch means for engaging said drum to said drive means, and means for remotely actuating said clutch;

and further including means by which said impulse means can be de-actuated so that said cam means moves in direct proportion to said shaft means.

13. A measuring instrument, comprising a shaft having an impulse means thereon, a cam means having a lobe thereon, said cam means being journaled to said shaft for limited movement relative thereto, said impulse means being connected to impart rapid motion into said cam means each time said shaft rotates through an angle proportional to the number of lobes on said cam means, a recording means, and means for actuating said recorder means by said lobe;

a drum, a clutch means, a second shaft, means for remotely actuating said clutch means; said clutch means, when actuated, engages said drum for rotation with said second shaft;

means by which said second shaft is rotated by the first recited shaft;

said recorder means being a graph, a scribe positioned to place indicia on said graph, said means responsive to movement of said cam means being connected to actuate said scribe means;

said drum includes a cable means moved thereabout for rotating said drum in response to linear movement of the cable means;

said means responsive to movement of said cam means includes a cam follower;

said cam follower connected to move said scribe means in response to movement of said lobe; and, means by which said impulse means can be de-actuated so that said cam means in direct proportion to said shaft means.

14. The measuring instrument of claim 13 wherein means are provided for causing said cam follower to engage said lobe only during part of its rotational movement.

15. The measuring instrument of claim 13 wherein said cam means has a plurality of lobes thereon, one said lobe being larger than the other of said lobes so that said scribe is moved a greater distance by the larger lobe as compared to the distance said scribe is moved by the remaining lobes.

* * * * *